United States Patent [19]
Hsu

[11] Patent Number: 5,947,497
[45] Date of Patent: Sep. 7, 1999

[54] FOLDABLE BICYCLE CARRIAGE

[76] Inventor: Hsiu-Lu Hsu, No. 22, Lane 245, Sec. 2, San Min Rd., Pan Chiao City, Taipei Hsien, Taiwan

[21] Appl. No.: 08/749,652

[22] Filed: Nov. 15, 1996

[51] Int. Cl.$^6$ ..................................................... B62B 1/04
[52] U.S. Cl. ........................................... 280/204; 280/656
[58] Field of Search .............................. 280/40, 63, 79.2, 280/47.17, 47.25, 204, 647, 648, 639, 656

[56] References Cited

U.S. PATENT DOCUMENTS

| | | | |
|---|---|---|---|
| 3,829,125 | 8/1974 | Davis | 280/204 |
| 5,020,814 | 6/1991 | George et al. | 280/204 |
| 5,460,395 | 10/1995 | Chen | 280/204 |
| 5,474,316 | 12/1995 | Britton | 280/204 |
| 5,577,746 | 11/1996 | Britton | 280/204 |
| 5,669,618 | 9/1997 | Chiu | 280/204 |
| 5,687,980 | 11/1997 | Eckroth | 280/204 |

FOREIGN PATENT DOCUMENTS

| | | | |
|---|---|---|---|
| 1228759 | 9/1960 | France | 280/204 |
| 2454951 | 12/1980 | France | 280/204 |
| 3202881 | 8/1983 | Germany | 280/204 |
| 17406 | 7/1901 | United Kingdom | 280/204 |

*Primary Examiner*—Christopher P. Ellis
*Assistant Examiner*—Frank Vanaman
*Attorney, Agent, or Firm*—Bacon & Thomas, PLLC

[57] ABSTRACT

A foldable bicycle carriage including a base frame, an upper support frame, a rear support frame, two connecting seats, a drag link, a wheel shaft, two wheels and a cover. The connecting seats are secured on two sides of the base frame and the rear support frame is secured to the upper support frame at upper end by pin members. Two lateral members of the rear support frame are bridged by a rearward inclinedly extending member having an upward projecting portion at the center. Two downward projecting portions are defined between the upward projecting portion and the lateral members. When the rear support frame is folded, the two downward projecting portions are engaged in the open portions of the connecting seats. A safety pin is disposed on the connecting seat for securely locking the carriage in a stretched state. The bicycle carriage can be quickly assembled and collapsed, conveniently carried and easily stored.

8 Claims, 5 Drawing Sheets

FOLDABLE BICYCLE CARRIAGE

BACKGROUND OF THE INVENTION

The present invention relates to a foldable bicycle carriage which is connected-to the rear end of the bicycle for carrying a child or other articles. The bicycle carriage can be quickly assembled and collapsed, conveniently carried and easily stored.

The existing bicycle includes a handle bar, a rider seat for the rider and an article bracket disposed at the rear end of the frame body above the rear wheel of the bicycle. Such a bicycle is only for a single user to ride. However, when it is necessary for the rider to drive another person, the person must sit on the article bracket or on a transverse beam of the frame body between the handle bar and the rider seat. In the case of an infant or child, it will be impossible for the infant or child to stably sit on the article bracket and serious injury may occur if the infant or child, falls from the bicycle. Moreover, when sitting on the article bracket, the feet of the sitter are apt to be rolled into and injured by the spokes of the rear wheel of the bicycle.

To obviate the above shortcomings, a child seat is often added to the article bracket for a child to sit thereon. This may avoid the child falling from the bicycle. However, with respect to a bigger child, his/her feet are still apt to be injured by the spokes. Therefore, it is necessary to provide a safer way for the child to sit so as to avoid accidents during riding the bicycle.

SUMMARY OF THE INVENTION

It is therefore a primary object of the present invention to provide a foldable bicycle carriage connected which may be to the rear end of the bicycle and pulled thereby. A child can safely sit on the carriage without the dangers of falling or being injured by the spokes of the bicycle. The bicycle carriage can be easily and quickly assembled and collapsed, conveniently carried and easily stored.

According to the above object, the foldable bicycle carriage includes a base frame, an upper support frame, a rear support frame, two connecting seats, a drag link, a wheel shaft, two wheels and a cover.

The base frame is a U-shaped frame body having an open portion. Pin holes and thread holes are formed at free ends of two lateral members and near two bent portions of the base frame respectively. Two fixing plates are welded under the two lateral members and disposed with downward extending plate boards formed with shaft holes.

The upper support frame is a rectangular frame body formed with downward bent portions at front and rear ends respectively. The downward bent portions are formed with pin holes. A thread hole is additionally formed on the front downward bent portion above and perpendicular to the pin hole.

The rear support frame is a substantially U-shaped frame body having an open portion. Two lateral members of the rear support frame are formed with pin holes. The lateral members are bridged by a rearward extending member having an upward projecting portion at the center. Two downward projecting portions are defined between the upward projecting portion and the lateral members.

Each connecting seat includes an upper and a lower L-shaped connecting plates. An upright connecting plate is disposed on the corner of each connecting seat to interconnect the upper and lower connecting plates with each other so as to define open portions at front and rear ends respectively. A thread hole is formed at the rear end of each connecting plate, while a movable safety pin is disposed at front end thereof.

The drag link is substantially straight with a slightly curved intermediate part near a rear end of the drag link. An insertion pin seat is pivotally disposed at a front end of the drag link. A locating seat is disposed at the rear end thereof for connecting with the upper support frame. The locating seat includes left and right clip plates defining a clip mouth. Each clip plate is formed with a thread hole.

The wheels are freely rotatably connected with the carriage by the wheel shaft which is passed through the shaft holes of the fixing plates welded under the base frame.

The cover is made by sewing. Two lateral sides of the cover are disposed with windows made of mesh-like fabric. A turnable door made of mesh-like fabric and transparent plastic fabric is disposed on front side of the cover. A zipper is disposed along the edge of the door for opening/closing the door. An openable door is disposed on rear side of the cover, which can be opened by a zipper.

The present invention can be best understood through the following description and accompanying drawing, wherein:

DETAILED DESCRIPTION OF THE PREFERRED EMBODIMENTS

Figure 1:
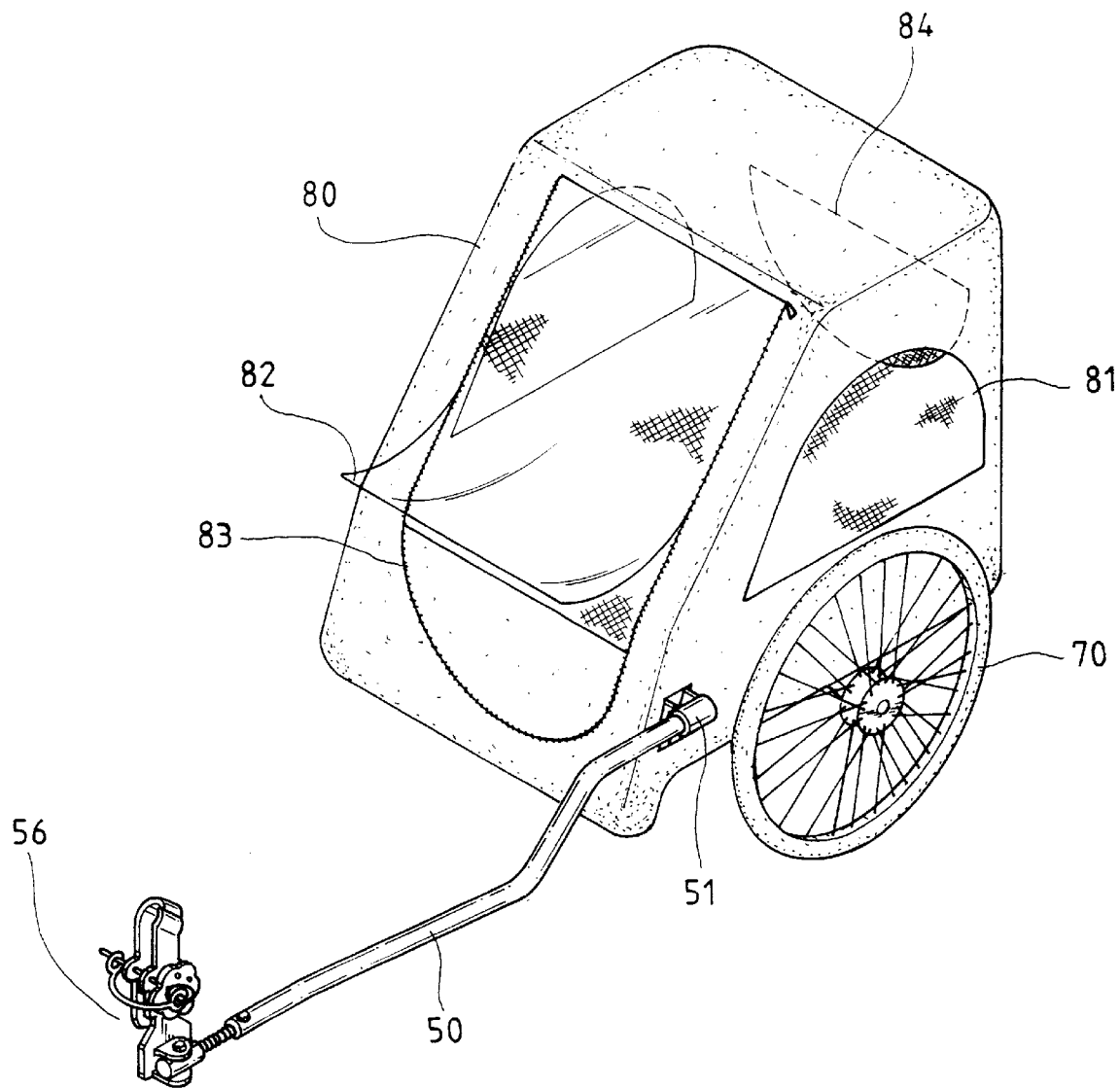
FIG. 1 is a perspective assembled view of the bicycle carriage of the present invention.
Figure 2:
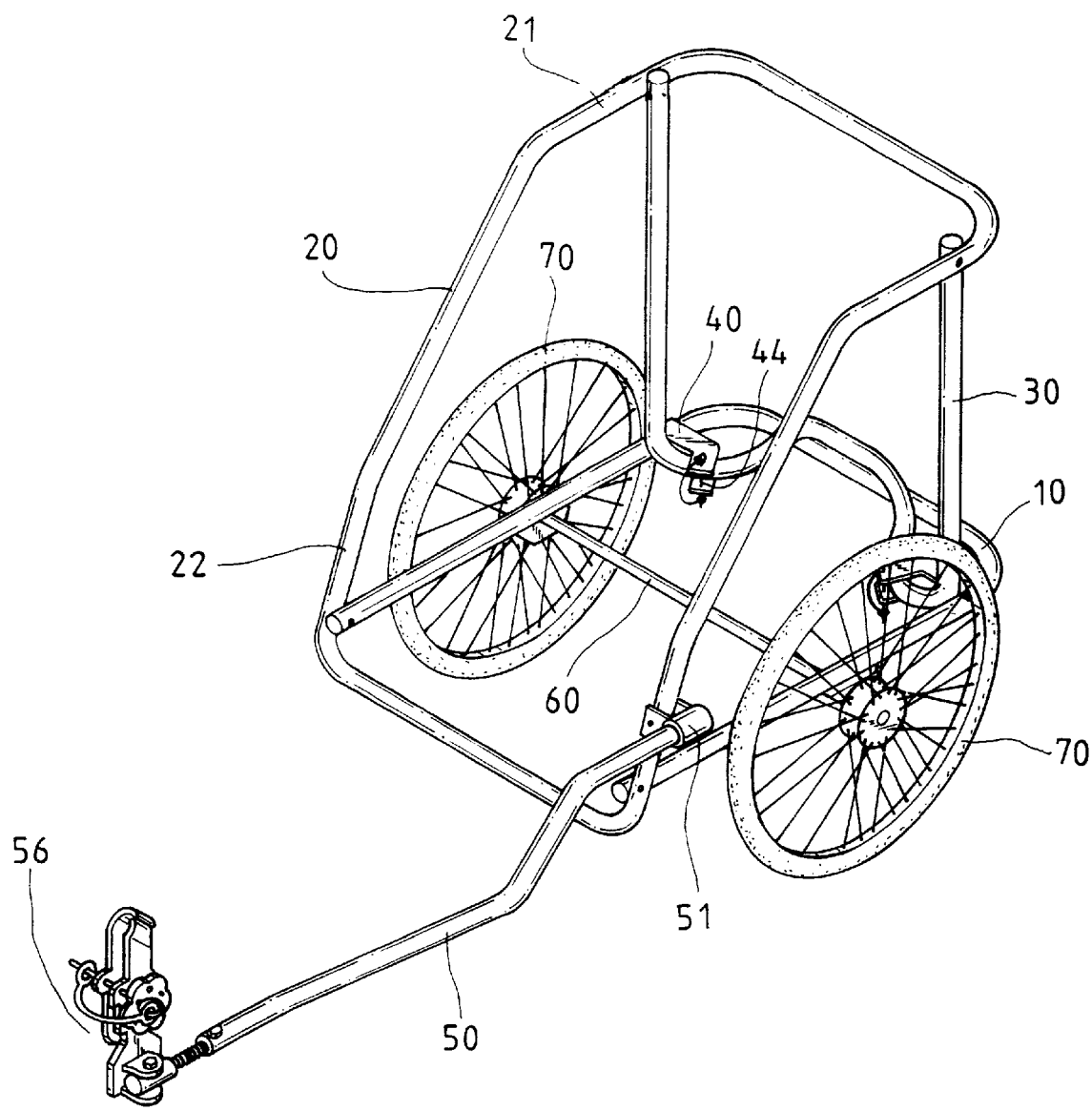
FIG. 2 is a perspective assembled view showing the connection between the frame bodies of the present invention.

Please refer to FIGS. 1 and 2. The foldable bicycle carriage of the present invention includes a base frame 10, an upper support frame 20, a rear support frame 30, two connecting seats 40, a drag link 50, a wheel shaft 60, two wheels 70 and a cover 80.

Figure 3:
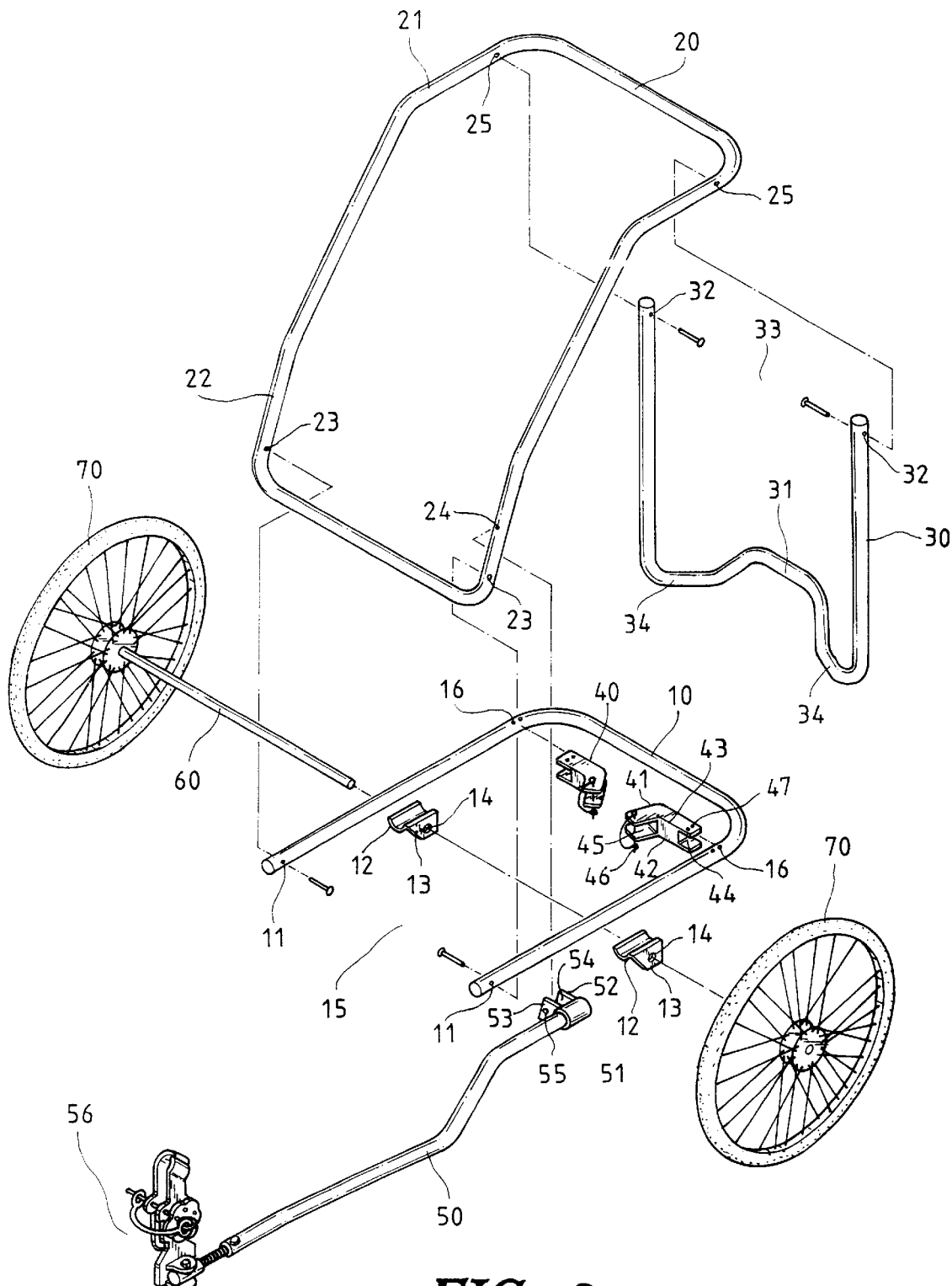
FIG. 3 is a perspective exploded view of the frame bodies of the present invention.

Referring to FIGS. 1 and 3, the base frame 10 is a U-shaped frame body having an open portion 15. Pin holes 11 and thread holes 16 are respectively formed at free ends of two lateral members and near two bent portions of the base frame 10. Two fixing plates 12 are welded under the two lateral members and disposed with downward extending plate boards 13 formed with shaft holes 14 for the wheel shaft 60.

The upper support frame 20 is a rectangular frame body formed with downward bent portions 21, 22 at front and rear ends respectively. The downward bent portions 21, 22 are formed with pin holes 23, 25. In addition, a thread hole 24 is formed on the front downward bent portion 22 above and perpendicular to the pin hole 23.

The rear support frame 30 is a substantially U-shaped frame body having an open portion 33. Two lateral members of the rear support frame 30 are formed with pin holes 32. The lateral members are bridged by a rearward extending member having an upward projecting portion 31 at the center. Two downward projecting portions 34 are defined between the upward projecting portion 31 and the lateral members.

Each connecting seat 40 includes an upper and a lower L-shaped connecting plates 41, 42. An upright connecting plate 43 is disposed on the corner of each connecting seat 40 to interconnect the upper and lower connecting plates 41, 42 with each other so as to define respectively open portions 44, 45 at front and rear ends. A thread hole 47 is formed at the rear end of each connecting plate 41, 42, while a movable safety pin 46 is disposed at the front end thereof.

The drag link 50 is substantially straight with a slightly curved intermediate part near a rear end of the drag link. An insertion pin seat 56 is pivotally disposed at a front end of the drag link. A locating seat 51 is disposed at the rear end thereof. The locating seat 51 includes left and right clip plates 52, 53 which are disposed in separate substantially parallel planes to define a clip mouth 54. Each clip plate 52, 53 is formed with a thread hole 55.

The wheels 70 are freely rotatably connected with the carriage by the wheel shaft 60 which is passed through the shaft holes 14 of the fixing plates 12 welded under the base frame 10.

The cover 80 is made of waterproof canvas by sewing. Two lateral sides of the cover are disposed with windows 81 made of mesh fabric. A turnable door 82 made of a mesh fabric layer and a transparent plastic fabric layer is disposed on front side of the cover. A zipper 83 is disposed along the edge of the door for opening/closing the door. An openable door 84 is disposed on rear side of the cover, which can be opened by a zipper.

Figure 4:
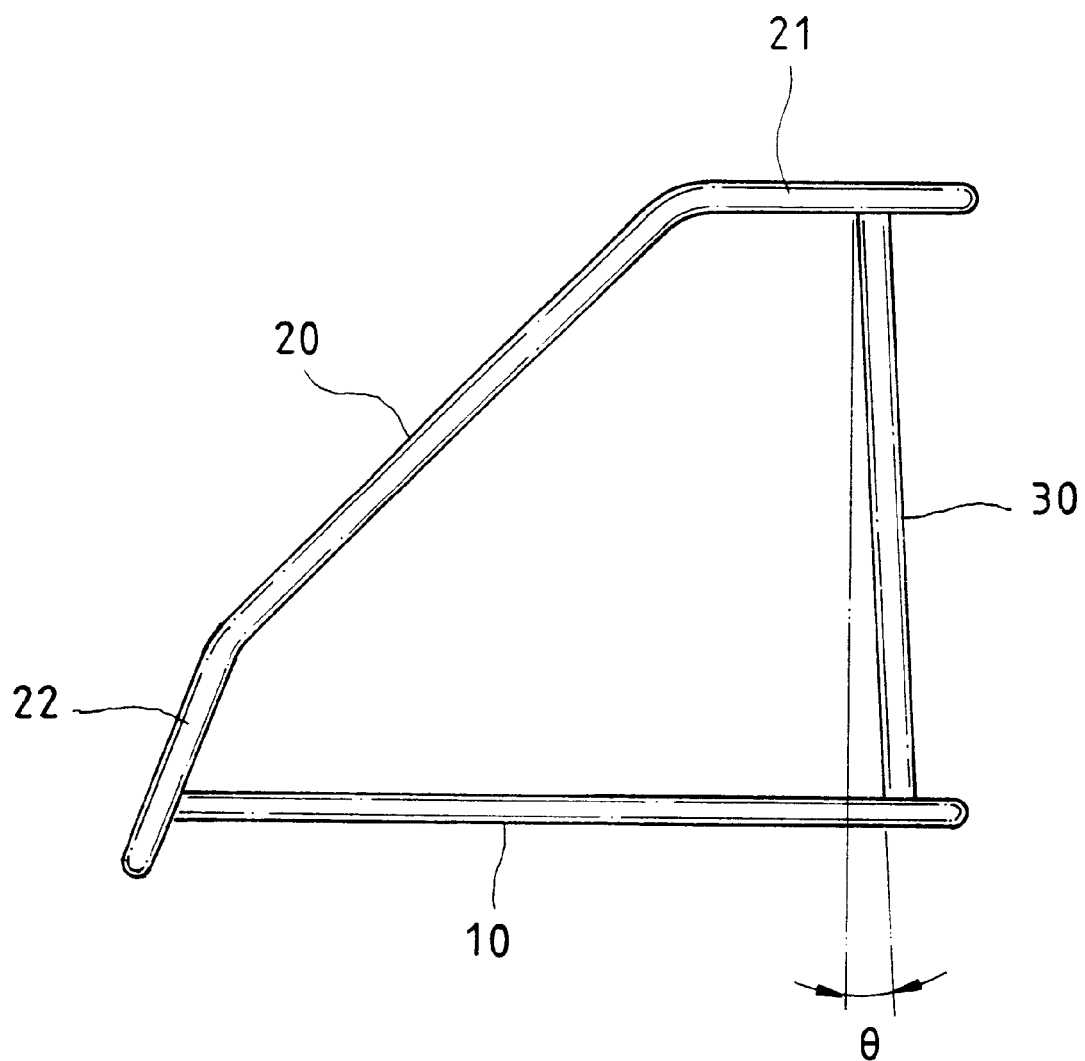
FIG. 4 is a side view showing the base frame, upper support frame and rear support frame of the present invention.

Referring to FIGS. 2 and 3, when assembled, the lateral members of the base frame 10 are placed into the front bent portions 22 of the upper support frame 20 and secured thereto by screws. The lateral members of the rear support frame 30 are placed into the rear bent portions 21 of the upper support frame 20 and secured thereto. Then the rear open portions 44 of the connecting seats 40 are fitted on the base frame 10 near the bent portions of the base frame 10 and a screw or connecting member (not shown) is screwed into the thread holes 47, 16 of the connecting seats 40 and the bent portions to fasten the connecting seats 40. After the cover 80 is fitted with the assembly, the rear support frame 30 is folded upright to locate the downward projecting portions 34 in the front open portions 45 of the connecting seats 40 and to secure the rear support frame 30 in the up right position with the movable safety pin 46. The wheel shaft 60 is passed through the shaft holes 14 of the plate boards 13 of the fixing plates 12. Then the thread hole in one of the front bent portion 22 of the upper support frame 20 is positioned within the clip mouth 54 defined by the left and right clip plates 52, 53 of the locating seat 51 of the drag link 50 and tightened therein by a second connecting member (not shown) which adapted to cooperate with the respective thread holes Referring to FIG. 4 which is a side view showing the connection between the base frame 10, upper support frame 20 and rear support frame 30, the rear support frame 30 is connected with the base frame 10 by the connecting seats 40. Due to the bending angle of the L-shaped body of the connecting seat 40, after the rear support frame 30 is connected with the base frame 10, these two frames form a rearward inclined angle, whereby the depressing force exerted by the rear support frame 30 can be stably born by the upright connecting plates 43 of the connecting seats 40. The movable safety pins 46 of the connecting seat 40 serves as a safety insertion pin for locking the frame bodies in an erected state. Reversely, after the movable safety pin 46 is extracted, the downward projecting portions 34 of the rear support frame 30 can be detached from the front open portions 45 of the connecting seats 40 and pushed out toward the open portion 15 of the base frame 10 with the upper support frame 20 brief depressed so as to fold the frame body into a collapsed state.

Figure 5:
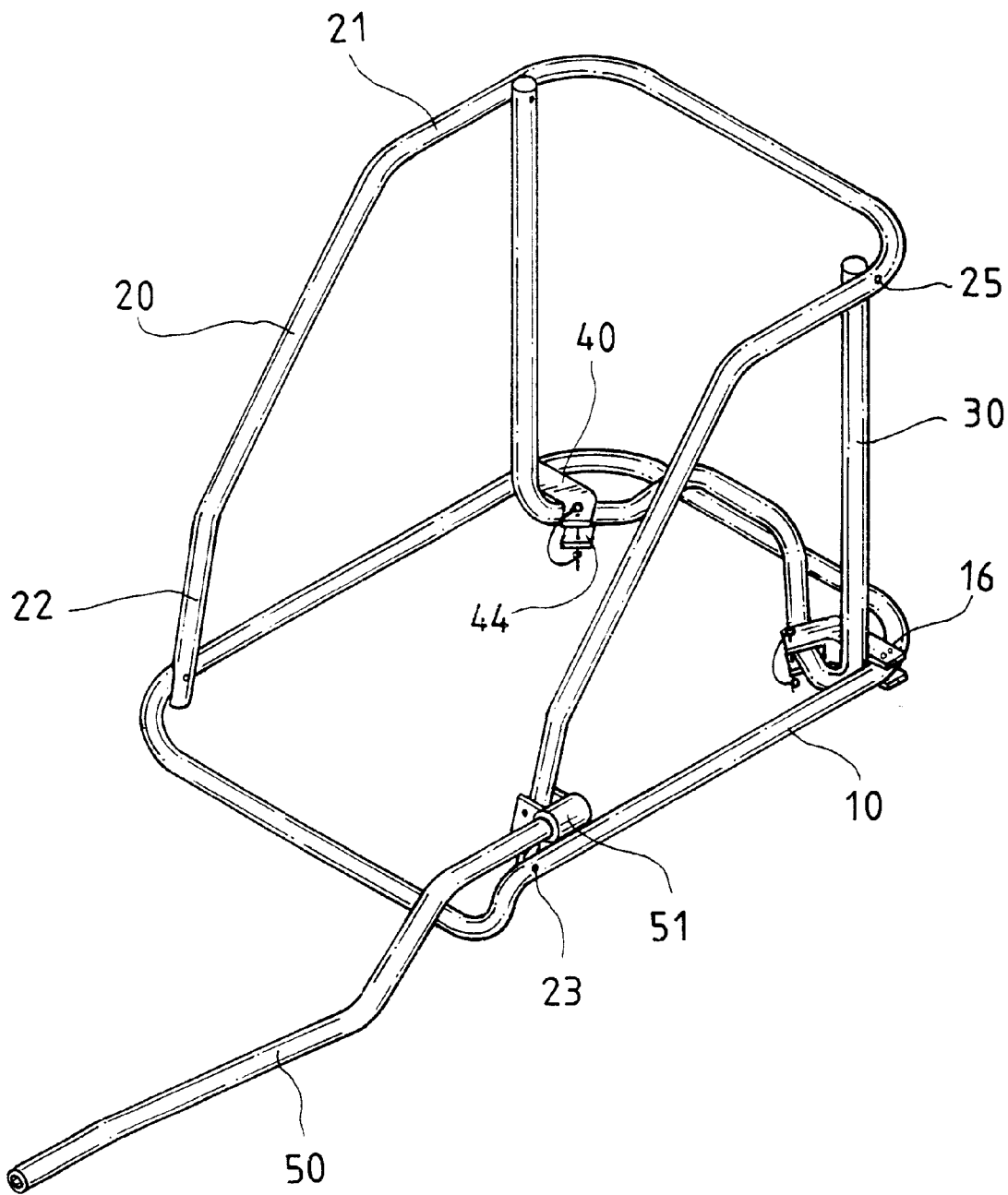
FIG. 5 is a perspective view of another embodiment of the present invention.

FIG. 5 shows another embodiment of the present invention, in which the base frame 10 is a rectangular frame body. The front end of the base frame 10 is disposed with upward bent slipproof portions 17 formed with pin holes 11. Thread holes 16 are respectively formed on two bent portions of the base frame 10. The two connecting seats 40 are secured on the base frame 10 by screws screwed in the thread holes 16.

The upper support frame 20 in this embodiment is a U-shaped frame body with pin holes 23, 25 formed at free ends of the lateral members and the rear bent portions respectively. A thread hole 24 is formed above the pin hole 23 and perpendicular thereto. The rear support frame 30 is connected with the upper support frame 20 by pin holes 25 to form a rigid frame body.

It should be noted that the above description and drawings are only used for illustrating some embodiments of the present invention, not intended to limit the scope thereof. Any variation and derivation from the above description and drawings should be included in the scope of the present invention.

What is claimed is:

1. A foldable bicycle carriage, comprising:

a U-shaped base frame formed by two lateral members extending from two bent portions toward an open portion;

a pin hole formed at a free end of each of the lateral members;

a thread hole formed in each of the lateral members near the respective bent portions;

a fixing plate welded under each of the lateral members, the fixing plates each including a downward extending plate board, the plate boards each having a shaft hole;

a rectangular upper support frame having downward bent portions at front and rear ends thereof;

pin holes formed in the rear bent portion;

pin holes formed in the front bent portion;

a substantially U-shaped rear support frame formed by two lateral members which are bridged by a rearward extending member and two downward projecting portions and which extend from the downward projecting portions toward an open portion, the rearward extending member having an upward projecting center portion with the downward projecting portions being defined between the lateral members and the upward projecting center portion;

two connecting seats each including an upper L-shaped connecting plate, a lower L-shaped connecting plate and an upright connecting plate which is disposed on the connecting seat to interconnect the upper and lower L-shaped connecting plates with each other so as to define open portions at front and rear ends of the L-shaped connecting plates, respectively;

at least one thread hole formed at the rear end of each connecting plate, each connecting plate being connected to the respective lateral member of the base frame by a connecting member which is adapted to cooperate with the thread hole at the rear end of the connecting plate and the thread hole in the respective lateral member, each connecting plate projecting inward from the respective lateral member of the base frame;

a pin hole formed at the front end of each connecting plate;

a removable safety pin disposed in each of the pin holes at the front ends of the connecting plates;

two wheels freely rotatably connected with the carriage by a wheel shaft which is passed through the shaft holes of the plate boards of the fixing plates welded under the lateral members of the base frame; and a plurality of pins disposed in all of the pin holes to pivotally connect the front end of the upper support frame to the free ends of the lateral members and the rear end of the upper support frame to the lateral members of the rear support frame;

wherein when the carriage is erected the downward projecting portions of the rear support frame are secured in the respective front open portions of the connecting seats with the removable safety pins inserted in the pin holes at the front ends of the connecting plates; and wherein when the carriage is collapsed the safety pins are removed from the pin holes at the front ends of the connecting plates releasing the downward projecting portions from the respective front open portions of the connecting seats, the rear support frame extends inwardly and the upper support frame is positioned adjacent the base frame.

2. A foldable bicycle carriage according to claim 1, further comprising:

a substantially straight drag link with a slightly curved intermediate part near a rear end of the drag link;

an insertion pin seat pivotably disposed at a front end of the drag link;

a locating seat disposed at the rear end of the drag link, the locating seat including a left clip plate and a right clip plate which are disposed in separate substantially parallel planes to define a clip mouth;

a thread hole formed in each clip plate;

a thread hole formed in the front bent portion of the upper support frame above and perpendicular to one of the pin holes of the front bent portion; and a second connecting member which is adapted to cooperate with the thread holes in the clip plates and the thread hole in the front bent portion so that the front bent portion of the upper support frame is secured in the clip mouth.

3. A foldable bicycle carriage according to claim 1, further comprising:

a sewn cover having a front side, two lateral sides and a rear side;

a window made of mesh fabric disposed on each of the lateral sides of the cover;

a turnable door made of a mesh fabric inner layer and a transparent plastic outer layer disposed on the front side of the cover;

a first zipper disposed along an edge of the turnable door for opening/closing thereof; and an openable door disposed on the rear side of the cover which is openable by a second zipper.

4. A foldable bicycle carriage according to claim 3, further comprising:

a substantially straight drag link with a slightly curved intermediate part near a rear end of the drag link;

an insertion pin seat pivotably disposed at a front end of the drag link;

a locating seat disposed at the rear end of the drag link, the locating seat including a left clip plate and a right clip plate which are disposed in separate substantially parallel planes to define a clip mouth;

a thread hole formed in each clip plate;

a thread hole formed in the front bent portion of the upper support frame above and perpendicular to one of the pin holes of the front bent portion; and a second connecting member which is adapted to cooperate with the thread holes in the clip plates and the thread hole in the front bent portion so that the front bent portion of the upper support frame is secured in the clip mouth.

5. A foldable bicycle carriage, comprising:

a rectangular base frame formed by two lateral members, a front member and a rear member connected together by front bent portions and rear bent portions;

a pin hole formed in each of the lateral members near the respective front bent portions;

a thread hole formed in each of the lateral members near the respective rear bent portions;

a fixing plate welded under each of the lateral members, the fixing plates each including a downward extending plate board, the plate boards each having a shaft hole;

a U-shaped upper support frame formed by two lateral members extending from two bent portions toward an open portion, the two lateral members having downward bent portions at front and rear ends thereof, the front downward bent portions being at the open portion of the upper support frame;

pin holes formed in the lateral members of the upper support frame near the rear downward bent portions;

pin holes formed in the lateral members near the front downward bent portions;

a substantially U-shaped rear support frame formed by two lateral members which are bridged by a rearward extending member and two downward projecting portions and which extend from the downward projecting portions toward an open portion, the rearward extending member having an upward projecting center portion with the downward projecting portions being defined between the lateral members and the upward projecting center portions;

two connecting seats each including an upper L-shaped connecting plate, a lower L-shaped connecting plate, and an upright connecting plate which is disposed on the connecting seat to interconnect the upper and lower L-shaped connecting plates with each other so as to define open portions at front and rear ends of the L-shaped connecting plates, respectively;

at least one thread hole formed at the rear end of each connecting plate, each connecting plate being connected to the respective lateral member of the base frame by a connecting member which is adapted to cooperate with the thread hole at the rear end of the connecting plate and the thread hole in the respective lateral member, each connecting plate projecting inward from the respective lateral member of the base frame;

a pin hole formed at the front end of each connecting plate;

a removable safety pin disposed in each of the pin holes at the front ends of the connecting plates;

two wheels freely rotatably connected with the carriage by a wheel shaft which is passed through the shaft holes of the plate boards of the fixing plates welded under the lateral members of the base frame; and a plurality of pins disposed in all of the pin holes to pivotally connect the front downward bent portion of the lateral members of the upper support frame to the lateral members of the base frame near the front bent portion and the rear downward bent portions of the lateral members of the upper support frame to the lateral members of the rear support frame;

wherein when the carriage is erected the downward projecting portions of the rear support frame are secured in the respective front open portions of the connecting seats with the removable safety pins inserted in the pin holes at the front ends of the connecting plates; and wherein when the carriage is collapsed the safety pins are removed from the pin holes at the front ends of the connecting plates releasing the downward projecting portions from the respective front open portions of the connecting seats, the rear support frame extends inwardly and the upward support frame is positioned adjacent the base frame.

6. A foldable bicycle carriage according to claim 5, further comprising:

a substantially straight drag link with a slightly curved intermediate part near a rear end of the drag link;

an insertion pin seat pivotably disposed at a front end of the drag link;

a locating seat disposed at the rear end of the drag link, the locating seat including a left clip plate and a right clip plate which are disposed in separate substantially parallel planes to define a clip mouth;

a thread hole formed in each clip plate;

a thread hole formed in the front bent portion of the upper support frame above and perpendicular to one of the pin holes of the front bent portion; and a second connecting member which is adapted to cooperate with the thread holes in the clip plates and the thread hole in the front bent portion so that the front bent portion of the upper support frame is secured in the clip mouth.

7. A foldable bicycle carriage according to claim 5, further comprising:

a sewn cover having a front side, two lateral sides and a rear side;

a window made of mesh fabric disposed on each of the lateral sides of the cover;

a turnable door made of a mesh fabric inner layer and a transparent plastic outer layer disposed on the front side of the cover;

a first zipper disposed along an edge of the turnable door for opening/closing thereof; and an openable door disposed on the rear side of the cover which is openable by a second zipper.

8. A foldable bicycle carriage according to claim 7, further comprising:

a substantially straight drag link with a slightly curved intermediate part near a rear end of the drag link;

an insertion pin seat pivotably disposed at a front end of the drag link;

a locating seat disposed at the rear end of the drag link, the locating seat including a left clip plate and a right clip plate which are disposed in separate substantially parallel planes to define a clip mouth;

a thread hole formed in each clip plate;

a thread hole formed in the front bent portion of the upper support frame above and perpendicular to one of the pin holes of the front bent portion; and a second connecting member which is adapted to cooperate with the thread holes in the clip plates and the thread hole in the front bent portion so that the front bent portion of the upper support frame is secured in the clip mouth.

* * * * *